United States Patent [19]

Tolentino

[11] Patent Number: 4,568,566
[45] Date of Patent: Feb. 4, 1986

[54] ACRYLIC-FUNCTIONAL SILICONE RESIN COMPOSITIONS

[75] Inventor: Luisito A. Tolentino, Ballston Lake, N.Y.

[73] Assignee: General Electric Company, Waterford, N.Y.

[21] Appl. No.: 666,394

[22] Filed: Oct. 30, 1984

[51] Int. Cl.$^4$ .............................................. B05D 3/06
[52] U.S. Cl. ................................... 427/54.1; 428/447; 528/26; 528/32
[58] Field of Search .................. 528/26, 32; 427/54.1; 428/447

[56] References Cited

U.S. PATENT DOCUMENTS

| | | | |
|---|---|---|---|
| 2,793,223 | 5/1957 | Merker | 528/26 |
| 2,922,806 | 1/1960 | Merker | 528/26 |
| 3,865,588 | 2/1975 | Ohto et al. | 528/32 |
| 3,878,263 | 4/1975 | Martin | 528/14 |
| 3,884,950 | 5/1975 | Koda et al. | 528/21 |
| 3,886,865 | 6/1975 | Ohto et al. | 528/21 |
| 4,201,808 | 5/1980 | Cully et al. | 428/40 |
| 4,216,303 | 8/1980 | Novicky | 528/32 |
| 4,348,454 | 9/1982 | Eckberg | 525/25 |
| 4,395,496 | 7/1983 | Wittmann et al. | 528/32 |

*Primary Examiner*—Melvyn I. Marquis
*Attorney, Agent, or Firm*—Gary L. Loser

[57] ABSTRACT

There is provided a curable silicone composition, comprising:
(a) from 75 to 100 mole percent chemically combined siloxy units having the formula $R_3SiO_{0.5}$, $RSiO_{1.5}$ and $SiO_2$; and
(b) from 0 to 25 mole percent $R_2SiO$ units, there being present a number of R units having the general formula:

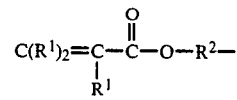

effective for curing said silicone resin upon exposure to ultraviolet radiation in the presence of a photoinitiator or upon heating in the presence of a free radical type catalyst.

17 Claims, No Drawings

ACRYLIC-FUNCTIONAL SILICONE RESIN COMPOSITIONS

BACKGROUND OF THE INVENTION

The present invention relates to acrylic-functional silicone compositions. More particularly, the present invention relates to acrylic-functional silicone-resins which are curable upon exposure to ultraviolet radiation or upon heating in the presence of a free radical type catalyst to compositions useful as conformal coatings or as coatings for optical fibers.

Organopolysiloxanes containing acrylate groups which cure upon exposure to ultraviolet radiation or upon heating in the presence of a free radical type catalyst are known in the art. Generally, these compositions are useful only as release coatings because of their cheesy or crumbly nature. To the best of applicant's knowledge, curable acrylate-functional organopolysiloxanes which are useful for making conformal coatings or as coatings for optical fibers (i.e. they possess the requisite physical properties) are unavailable in the art. Accordingly, there is provided by the present invention solventless, acrylate-functional silicone resins which are curable upon exposure to ultraviolet radiation or upon heating in the presence of a free radical type catalyst to a composition useful as a conformal coating or as a coating for optical fibers.

Merker, U.S. Pat. No. 2,793,223, discloses siloxanes of the formula:

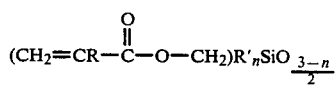

wherein R is a hydrogen atom or methyl, R' is a monovalent hydrocarbon radical, and n has a value from 1 to 2, inclusive. Such acryloxy substituted siloxanes can optionally be copolymerized with siloxanes of the formula:

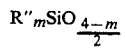

wherein R'' is a monovalent hydrocarbon radical, an acetoxymethyl radical, or a halogenated monovalent hydrocarbon radical, and m has an average value from 1 to 3, inclusive. Consideration of the teachings of Merker reveals that trifunctional units having acrylate-functional groups bonded thereto as well as tetrafunctional siloxy units are not contemplated.

Merker, U.S. Pat. No. 2,922,806, expands upon the teaching of U.S. Pat. No. 2,793,223, in that there are provided organopolysiloxanes containing polymeric units of the formula:

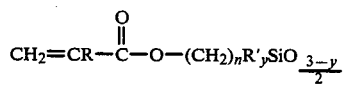

wherein n is an integer from 2 to 4, inclusive, y is an integer from 0 to 1, inclusive, R is a hydrogen atom or a methyl radical, and R' is a monovalent hydrocarbon radical free of aliphatic unsaturation. Again, such acryloxy substituted siloxanes can optionally be copolymerized with siloxanes of the formula:

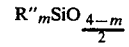

wherein R'' is a monovalent hydrocarbon radical or a halogenated monovalent hydrocarbon radical, and m is an integer from 0 to 3, inclusive, the average value of m being from 0.8 to 3, inclusive. Analysis of the specification and examples reveals that the presence of tetrafunctional siloxy units is not contemplated and that at least about 33 mole % difunctional siloxy units must be present in the composition.

Ohto et al., U.S. Pat. No. 3,782,940, discloses organopolysiloxanes containing at least one photopolymerizable organic silicon radical represented by the general formula:

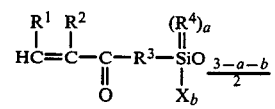

wherein $R^1$ is a hydrogen atom or an unsubstituted or halogen-substituted phenyl radical; $R^2$ is a hydrogen atom or a methyl radical; $R^3$ is an unsubstituted or halogen-substituted divalent hydrocarbon radical having from 1 to 10 carbon atoms; $R^4$ is an unsubstituted or a halogen-substituted monovalent hydrocarbon radical having from 1 to 10 carbon atoms, X is a hydroxyl radical or an alkoxy radical having from 1 to 4 carbon atoms, and a and b are each equal to 0, 1 or 2, with the proviso that a+b equals 0, 1 or 2. Reference to the specification and examples makes clear that tetrafunctional siloxy units are not contemplated and that the difunctional siloxy unit concentration must be at least about 40 mole percent. U.S. Pat. No. 3,865,588 to Ohto et al. discloses substantially the same chemistry as the aforesaid U.S. Pat. No. 3,782,940.

Martin, U.S. Pat. No. 3,878,263, discloses organopolysiloxanes of the general formula:

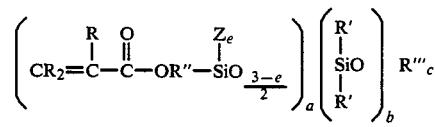

wherein R is selected from hydrogen and monovalent hydrocarbon radicals having from 1 to 12 carbon atoms, R' is selected from monovalent hydrocarbon radicals, halogenated monovalent hydrocarbon radicals, and cyanoalkyl radicals having from 1 to 18 carbon atoms, R'' is selected from the group consisting of a divalent hydrocarbon radical having from 2 to 18 carbon atoms, and the corresponding divalent hydrocarbon radical containing C—O—C linkages, R''' is a radical selected from the group consisting of $R''''O_{0.5}$ and $R'SiO_{0.5}$, Z is a group selected from OR''''. R'''' or $OSiR'_3$, in which R'''' is selected from hydrogen and monovalent hydrocarbon radicals, a and b are each numbers from 1 to 20,000, c is a number from 0 to 3, and e is a number from 0 to 2, with the proviso that when c is zero, then at least one Z must be OR''''. Martin does not contemplate including tetrafunctional siloxy units in the composition nor, in view of the examples, does he contemplate less than about 60 mole percent difunctional siloxy units.

Ohto et al., U.S. Pat. No. 3,886,865, relates to photopolymerizable organopolysiloxanes of the general formula:

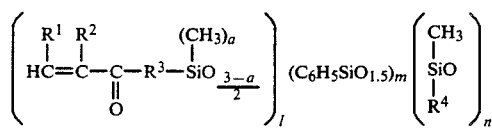

wherein $R^1$ is hydrogen, an unsubstituted or halogen-substituted phenyl radical, $R^2$ is a hydrogen atom or a methyl radical, $R^3$ is a divalent hydrocarbon radical having from 1 to 3 carbon atoms, $R^4$ is methyl or trifluoropropyl, a is 0 or 1, and m and n are positive integers with the proviso that n exceeds 25, while n/l and n/m are 25 to 20000 and 2.5 to 50, respectively. From the ratios of n/l and n/m it is clear that the trifunctional siloxy units are not present in a large amount and, further, tetrafunctional siloxy units are not contemplated at all.

Cully et al., U.S. Pat. No. 4,201,808, describes photocurable organopolysiloxanes useful as release coatings comprising an organopolysiloxane containing an average of at least one acryloxy and/or methacryloxy group per molecule, a low molecular weight polyacryl crosslinking agent, and, optionally, a photosensitizer. The organopolysiloxanes having acryloxy and/or methacryloxy groups have the average formula:

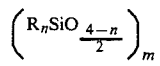

wherein m has an average value greater than about 25, R is, independently, acryloxy, methacryloxy, an unsubstituted monovalent hydrocarbon radical having from 1 to 20 carbon atoms, or a substituted monovalent hydrocarbon radical wherein the substituents are selected from the group consisting of chloro, fluoro, cyano, amido, nitro, ureido, isocyanato, carbalkoxy, hydroxy, acryloxy and methacryloxy, and n has an average value from about 1.8 to 2.2; said organopolysiloxane containing an average of at least one R group which contains an acryloxy or methacryloxy group. Reference to the specification and examples makes clear that the acryloxy-functional polysiloxanes are comprised of substantially all diorganosiloxy units (e.g. free of trifunctional and tetrafunctional siloxy units).

Eckberg, U.S. Pat. No. 4,348,454, discloses acrylic functional polysiloxanes which are especially useful for ultraviolet curable silicone release coating applications. As in all release coating applications the polysiloxane consists essentially of diorganosiloxy units and thus is not useful as a conformal coating.

SUMMARY OF THE INVENTION

It is an object of the present invention to provide novel solventless silicone resin compositions.

It is another object of the present invention to provide solventless, acrylate-functional silicone resin compositions which are curable upon exposure to ultraviolet radiation or upon heating in the presence of a free radical type catalyst.

Another object of the present invention is to provide silicone resin compositions useful as conformal coatings for electronic components and as coatings for optical fibers.

Still another object of the present invention is to provide methods for making solventless, acrylate-functional silicone resin compositions and methods for making articles having said silicone resin cured thereon.

There is provided in accordance with the teachings of the present invention a silicone resin composition, comprising:
(a) from 75 to 100 mole percent chemically combined siloxy units selected from units having the formula $R_3SiO_{0.5}$ units, $RSiO_{1.5}$ units and $SiO_2$ units; and
(b) from 0 to 25 mole percent $R_2SiO$ units;
wherein R is a substituted or unsubstituted monovalent organic radical, with the proviso that there are present a number of R radicals having the general formula

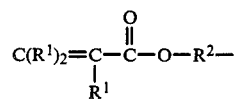

effective for curing said silicone resin composition upon exposure to ultraviolet radiation or upon heating in the presence of a free radical type catalyst, wherein $R^1$ is selected, independently, from the group consisting of hydrogen and monovalent substituted and unsubstituted hydrocarbon radicals having from 1 to 12 carbon atoms, and $R^2$ is a divalent substituted or unsubstituted hydrocarbon radical having from 1 to 18 carbon atoms or the corresponding oxyalkylene radical containing at least one C—O—C linkage, and wherein the total number of siloxy units is four or more, at least one of which has the formula $RSiO_{1.5}$ or $SiO_2$.

DESCRIPTION OF THE INVENTION

There is provided by the present invention a silicone resin composition, comprising:
(a) from 75 to 100 mole percent chemically combined siloxy units selected from units having the formula $R_3SiO_{0.5}$ units, $RSiO_{1.5}$ units and $SiO_2$ units; and
(b) from 0 to 25 mole percent $R_2SiO$ units;
wherein R is a substituted or unsubstituted monovalent organic radical, with the proviso that there are present a number of R radicals having the general formula

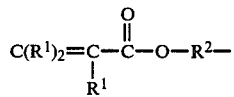

effective for curing said silicone resin composition upon exposure to ultraviolet radiation or upon heating in the presence of a free radical type catalyst, wherein $R^1$ is selected, independently, from the group consisting of hydrogen and monovalent substituted and unsubstituted hydrocarbon radicals having from 1 to 12 carbon atoms, and $R^2$ is a divalent substituted or unsubstituted hydrocarbon radical having from 1 to 18 carbon atoms or the corresponding oxyalkylene radical containing at least one C—O—C linkage, and wherein the total number of siloxy units is four or more, at least one of which has the formula $RSiO_{1.5}$ or $SiO_2$.

For purposes of this invention, R can be any monovalent substituted or unsubstituted organic radical. Specific examples of unsubstituted radicals are alkyl radicals such as methyl, ethyl, propyl, hexyl, octyl, octadecyl and the like; alkenyl radicals such as vinyl, allyl, hexenyl and the like; cycloaliphatic radicals such as cyclohexyl, cyclohexenyl, cyclopentyl and the like; aromatic radicals such as phenyl, naphthyl and the like; aralkyl radicals such as beta-phenylethyl. Examples of substituted radicals are any of the foregoing wherein at least one hydrogen atom has been replaced by a substituent selected from the group consisting of halogen, cyano, amido, nitro, ureido, isocyanato, alkoxy, hydroxy and the like. Preferably the R radicals are lower alkyl radicals such as methyl, ethyl, propyl, 3,3,3-trifluoropropyl or an aryl radical such as phenyl. Most preferably the R radicals are methyl, phenyl or a mixture thereof.

It is critical to the present invention that there be included among the R radicals a sufficient number of radicals having the formula

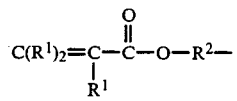

(I)

so as to ensure that the resin composition will cure upon exposure to ultraviolet radiation or upon heating in the presence of a free radical type catalyst. Examples of radicals included within the scope of $R^1$ are hydrogen and substituted or unsubstituted monovalent hydrocarbon radicals having from 1 to 12 carbon atoms. Preferably, $R^1$ is hydrogen, phenyl or a lower alkyl radical such as methyl, ethyl, or propyl. Most preferably $R^1$ is hydrogen, methyl, or phenyl or a mixture thereof. If $R^1$ is a substituted radical it can be substituted by an substituent identified hereinabove for R.

$R^2$ can be any divalent substituted or unsubstituted hydrocarbon radical having from 1 to 18 carbon atoms or the corresponding oxyalkylene radical having at least one C—O—C linkage. Examples of $R^2$ include alkylene radicals such as ethylene, propylene, butylene, pentamethylene, hexadecylmethylene and octadecylmethylene; arylene radicals such as phenylene, biphenylene and the corresponding alkylene and arylene radicals containing an oxygen atom.

The silicone resin composition of the instant invention comprises 75 to 100 mole percent chemically combined siloxy units selected from the group consisting of $R_3SiO_{0.5}$ units (referred to as M units), $RSiO_{1.5}$ units (referred to at T units) and $SiO_2$ units (referred to as Q units), and from 0 to 25 mole percent $R_2SiO$ units referred to as D units). Preferably the silicon resins of the present invention are substantially free of D units and thus consist primarily of M, T, and Q units or mixtures thereof. Accordingly, the preferred resins are MQ resins, MT resins and MTQ resins.

As indicated hereinabove, it is critical that there be present sufficient radicals defined by Formula I (referred to herein interchangably as acrylic, acrylic-functional, acrylate, acrylate-functional and the like) to ensure that the resin will cure upon exposure to ultraviolet radiation or upon heating in the the presence of a free radical type catalyst. Therefore, the artisan will appreciate that the siloxy units of the resin can have the formulas:

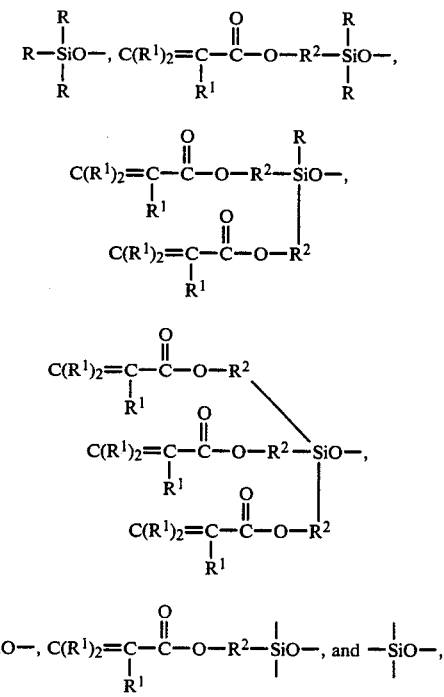

wherein R, $R^1$ and $R^2$ are defined as above.

The total number of acrylate-functional groups present need only be present in a sufficient number to effect crosslinking of the resin composition upon exposure to ultraviolet radiation or upon heating in the presence of a free radical type catalyst. Thus the number of acrylate-functional radicals may be as low as about 0.5 mole percent of the total R groups or it can be as much as 100 percent of the R groups. The artisan will, of course, be able to determine without undue experimentation the number of acrylate-functional radicals necessary to impart sufficient crosslinking for a particular purpose. Preferably the number of acrylate-functional groups will be present in an amount ranging from about 0.5 to about 80 mole percent of the number of R groups.

Although it is contemplated that the number of M units to Q units to T units or mixture thereof can vary as necessary to obtain desired properties, it has been found that particular ratios impart especially desirable properties to the cured resin. If an MQ resin is employed, the ratio of M units to Q units preferably ranges from about 1:1 to about 3:1; if an MT resin is employed, the ratio of M units to Q units preferably is from about 0.5:1 to about 2:1; and it an MTQ resin is employed, the ratio of M units to T units ranges from about 0.5:1 to about 2:1 and the ratio of T units to Q units is from about 0.5:1 to about 3:1.

In addition to the foregoing preferred ratios of the various types of siloxy units, it has been found that when the number of siloxy units per molecule is less than about 500 the resulting silicone resin can be employed free of solvent. Of course such compositions are especially preferable as they eliminate the need for energy-intensive ovens and expensive solvent recovery apparatus. However, resins which require the use of a solvent to aid in their application to substrates such as electronic components (e.g. conformal coating), optical fibers, and paper (release coating) are also intended to be within the scope of the appended claims.

The most preferred compositions are MQ resins and MTQ resins having less than about 500 siloxy units so that they are solvent free and have a ratio of M units to Q units, and M units to T units to Q units, respectively, as indicated hereinabove.

It is also possible to include in the silicone resin of the present invention up to about 25 mole percent diorganosiloxy units (D units) of the formula $R_2SiO$. Preferably, there should not be present more than about 10 mole percent of such diorganosiloxy units. Those skilled in the art will recognize that the inclusion of D units will impart flexibility to the cured composition, hence it is important that the number of D units does not exceed about 25 mole percent. The organic radicals bonded to the silicon atom of the D unit can be any of those listed hereinabove. Such diorganosiloxy units can be free of acrylate-functional radicals of Formula I, be a mixture of acrylate-functional radicals and organo radicals, or can all be acrylate functional radicals. Again, the artisan will be able to determine without undue experimentation what percentage of the R radicals of the diorganosiloxy units should be acrylate-functional for a particular application.

EXAMPLES

EXAMPLE 1

15.6 grams of a silicone hydride resin having one weight percent silicon-bonded hydrogen atoms and having the general formula

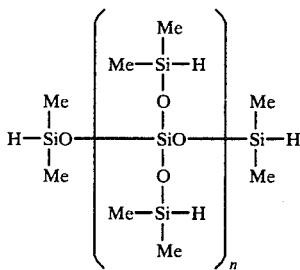

where n=2, 3 and 4 (i.e. a mixture of monomers) and Me is methyl, was added dropwise to a stirred mixture of 20 grams allylmethacrylate, 60 mg. 2,5-di-t-butyl hydroquinone, 0.16 gram Pt-octanol complex catalyst (3 weight percent Pt) and 150 ml hexane. The reaction mixture was heated at 50°–55° C. during the addition of silicone hydride resin and thereafter was maintained at 50°–60° C. for 9 hours. Hexene was then added and heated to reflux for 4 hours. The reaction mass was then cooled to room temperature and the hexane and hexene allowed to evaporate. Twenty five grams of an acrylate-functional resin having the above formula but wherein the hydrogen atoms were replaced with acrylate-functional groups was obtained.

EXAMPLE 2

The methacrylated silicone resin of Example 1 was mixed with 5 weight percent 2,2-diethoxyacetophenone photoinitiator and coated on a supercalendered kraft (SCK) substrate. The coated SCK substrate was UV-cured by passing it under a PPG Model 1202 Processor. All cures were under a nitrogen atmosphere.

Samples 1 through 3 in the following chart illustrate the practice of the present invention to obtain suitable release coatings. Samples 4 and 5 demonstrate that thicker coatings can be utilized but the lamp power and/or exposure time must be adjusted accordingly.

| Sample | Film Thickness | Lamp Power | Exposure Time | Result |
|---|---|---|---|---|
| 1 | 1 mil | 400 watts | 0.22 sec. | Excellent cure, smear-free hard film glossy appearance |
| 2 | 1 mil | 400 watts | 0.11 sec. | Same as 1 |
| 3 | 1 mil | 400 watts | 0.06 sec. | Cured well with slight smear |
| 4 | 2 mil | 400 watts | 0.11 sec. | Soft cure |
| 5 | 2 mil | 600 watts | 0.04 sec. | Cured well with slight smear |

EXAMPLE 3

Five grams of the methacrylated silicone resin of Example 1 was mixed with 0.1 gram cumene hydroperoxide. Duro activator (source: Loctite Corp.) was applied to one side of a test substrate and to one side of another piece of the test substrate was applied the resin/catalyst mixture. The two pieces were pressed together and allowed to cure at room temperature. The resin was judged to be fully cured when the two pieces of substrate could not be moved by hand as follows:

| Substrate | Cure Time |
|---|---|
| Glass | 30 minutes |
| Stainless Steel | 30 minutes |

This example illustrates the utility of the resins of the instant invention as a bonding material.

EXAMPLE 4

To a mixture of 25 grams (0.114 moles)

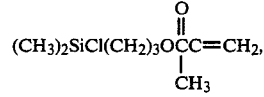

12.3 grams (0.114 moles) $(CH_3)_3SiCl$, and 16.7 grams (0.111 moles) $CH_3SiCl_3$ there was added dropwise 50 ml of water with stirring at 25° to 40° C. After completion of water addition, the mixture was transferred to a 250 ml separatory funnel. To the mixture there was added 50 ml toluene, thereafter the mixture was washed with water, and finally 5% $NaHCO_3$ was added until the mixture was neutral. The organic phase was stripped in a rotary evaporator at 50° C./8 mm Hg to yield 33 grams of silicone resin.

EXAMPLE 5

The procedure set forth in Example 4 was followed to prepare a silicone resin from the following reactants:
25 grams (0.114 moles)

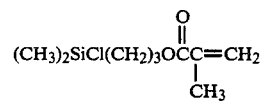

12.3 grams (0.114 moles) $(CH_3)_3SiCl$
14.6 grams (0.114 moles) $(CH_3)_2SiCl_2$
16.9 grams (0.114 moles) $CH_3SiCl_3$ There resulted 64.4 grams of silicone resin.

EXAMPLE 6

The procedure set forth in Example 4 was followed to prepare a silicon resin from the following reactants:

25 grams (0.114 moles)

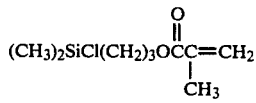

12.3 grams (0.114 moles) $(CH_3)_3SiCl$
16.9 grams (0.114 moles) $CH_3SiCl_3$
12.9 grams (0.076 moles) $SiCl_4$ There resulted 42 grams of silicone resin.

EXAMPLE 7

Each of the silicone resins prepared in Examples 4, 5 and 6 were mixed with 3 weight percent 2,2-diethoxyacetophenone photoinitiator. Two mil coatings of such mixture were manually applied onto a stainless steel substrate. The thus coated substrate was then exposed to a source of ultraviolet radiation under a nitrogen atmosphere as in Example 2 with the following results:

| Resin Examples | Lamp Power (watts) | Exposure Time | Result |
|---|---|---|---|
| 4 | 400 | 3 sec | Excellent cure, hard, glossy finish |
| 5 | 400 | 6 sec | Cured to a glossy finish with slight flexibility |
| 6 | 400 | 6 sec | Cured to a hard material |

I claim:

1. A curable silicone resin composition, comprising:
   (a) from 75 to 100 percent chemically combined siloxy units selected from units having the formula $R_3SiO_{0.5}$, $RSiO_{1.5}$ and $SiO_2$; and
   (b) from 0 to 25 mole percent $R_2SiO$ units;
wherein R is a substituted or unsubstituted monovalent organic radical with the proviso that there are present a number of R radicals having the general formula

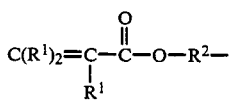

effective for curing said silicone resin composition upon exposure to ultraviolet radiation in the presence of a photoinitiator or upon heating in the presence of a free radical type catalyst, wherein $R^1$ is selected, independently, from the group consisting of hydrogen and monovalent substituted and unsubstituted hydrocarbon radicals having from 1 to 12 carbon atoms, and $R^2$ is a divalent substituted or unsubstituted hydrocarbon radical having from 1 to 18 carbon atoms or the corresponding oxyalkylene radical containing at least one C—O—C linkage, and wherein the total number of siloxy units is four or more, at least one of which has the formula $RSiO_{1.5}$ or $SiO_2$.

2. The composition of claim 1 wherein R is methyl or phenyl or a mixture thereof.

3. The composition of claim 1 wherein $R^1$ is hydrogen, methyl or phenyl or a mixture thereof.

4. The composition of claim 1 wherein the silicone resin is substantially free of $R_2SiO$ units.

5. The composition of claim 1 wherein the number of $R_2SiO$ units does not exceed about 10 mole percent of the total number of siloxy units.

6. The composition of claim 1 wherein the number of acrylate-functional radicals ranges from about 0.5 mole percent to 100 mole percent.

7. The composition of claim 1 wherein the number of acrylate-functional radicals ranges from about 0.5 mole percent to about 80 mole percent.

8. A curable silicone resin composition consisting essentially of chemically combined siloxy units of the formula $R_3SiO_{0.5}$ and $SiO_2$, where R is a monovalent substituted or unsubstituted organic radical with the proviso that there are present a number of R radicals having the general formula:

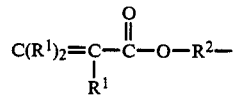

where $R^1$ is selected, independently, from the group consisting of hydrogen and monovalent substituted and unsubstituted hydrocarbon radicals having from 1 to 12 carbon atoms, $R^2$ is a divalent substituted or unsubstituted hydrocarbon radical having from 1 to 18 carbon atoms or the corresponding oxyalkylene radical containing at least one C—O—C linkage, effective for curing said silicone resin composition upon exposure to ultraviolet radiation in the presence of a photoinitiator or upon heating in the presence of a free-radical type catalyst, and wherein the ratio of $R_3SiO_{0.5}$ units to $SiO_2$ units ranges from about 3:1 to about 1:1.

9. A curable silicone resin composition consisting essentially of chemically combined siloxy units of the formula $R_3SiO_{0.5}$ and $RSiO_{1.5}$, where R is a monovalent substituted or unsubstituted organic radical with the proviso that there are present a number of R radicals having the general formula

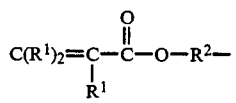

where $R^1$ is selected, independently, from the group consisting of hydrogen and monovalent substituted and unsubstituted hydrocarbon radicals having from 1 to 12 carbon atoms, $R^2$ is a divalent substituted or unsubstituted hydrocarbon radical having from 1 to 18 carbon atoms or the corresponding oxyalkylene radical containing at least one C—O—C linkage, effective for curing said silicone resin composition upon exposure to ultraviolet radiation in the presence of a photoinitiator or upon heating in the presence of a free radical type catalyst, and wherein the ratio of $R_3SiO_{0.5}$ units to $RSiO_{1.5}$ units is from about 2:1 to about 0.5:1.

10. A curable silicon resin composition consisting essentially of chemically combined siloxy units of the formula $R_3SiO_{0.5}$, $RSiO_{1.5}$ and $SiO_2$, where R is a monovalent substituted or unsubstituted organic radical with the proviso that there are present a number of R radicals having the general formula

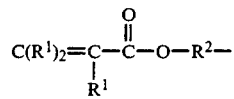

where $R^1$ is selected, independently, from the group consisting of hydrogen and monovalent substituted and unsubstituted hydrocarbon radicals having from 1 to 12 carbon atoms, $R^2$ is a divalent substituted or unsubstituted hydrocarbon radical having from 1 to 18 carbon atoms or the corresponding oxyalkylene radical containing at least one C—O—C linkage, effective for curing said silicone resin composition upon exposure to ultraviolet radiation in the presence of a photoinitiator or upon heating in the presence of a free radical type catalyst, and wherein the ratio of $R_3SiO_{0.5}$ units to $RSiO_{1.5}$ units is from about 2:1 to about 0.5:1.

11. A method for making a curable silicone resin, comprising reacting sufficient silane monomers to provide
   (a) from 75 to 100 mole percent chemically combined siloxy units selected from units having the formula $R_3SiO_{0.5}$, $RSiO_{1.5}$ and $SiO_2$; and
   (b) from 0 to 25 mole percent $R_2SiO$ units;
wherein R is a substituted or unsubstituted monovalent organic radical with the proviso that there are present a number of R radicals having the general formula

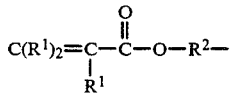

effective for curing said silicone resin composition upon exposure to ultraviolet radiation in the presence of a photoinitiator or upon heating in the presence of a free radical type catalyst, wherein $R^1$ is selected, independently, from the group consisting of hydrogen and monovalent substituted and unsubstituted hydrocarbon radicals having from 1 to 12 carbon atoms, and $R^2$ is a divalent substituted or unsubstituted hydrocarbon radical having from 1 to 18 carbon atoms or the corresponding oxyalkylene radical containing at least one C—O—C linkage, and wherein the total number of siloxy units is four or more, at least one of which has the formula $RSiO_{1.5}$ or $SiO_2$.

12. The method of claim 11 wherein the silane monomers are alkoxy-functional.

13. The method of claim 11 wherein the silane monomers are halogen functional.

14. A method for making a coated substrate, comprising:
   (A) applying to said substrate a curable silicon resin composition comprising:
      (a) from 75 to 100 mole percent chemically combined siloxy units selected from the group consisting of $R_3SiO_{0.5}$ units, $RSiO_{1.5}$ units and $SiO_2$ units; and
      (b) from 0 to 25 mole percent $R_2SiO$ units wherein R is a substituted or unsubstituted monovalent organic radical, with the proviso that there are present a number of R radicals having the general formula

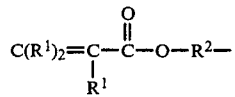

effective for curing said silicone resin composition upon exposure to ultraviolet radiation in the presence of a photoinitiator or upon heating in the presence of a free radical type catalyst, wherein $R^1$ is selected, independently, from the group consisting of hydrogen and monovalent substituted and unsubstituted hydrocarbon radicals having from 1 to 12 carbon atoms, and $R^2$ is a divalent substituted or unsubstituted hydrocarbon radical having from 1 to 18 carbon atoms or the corresponding oxyalkylene radical containing at least one C—O—C linkage, and wherein the total number of siloxy units is four or more, at least one of which has the formula $RSiO_{1.5}$ or $SiO_2$, and
   (B) curing said silicone resin composition.

15. The method of claim 14 wherein curing is effected by exposing the coated substrate to ultraviolet radiation in the presence of an effective amount of photoinitiator.

16. The method of claim 14 wherein curing is effected by heating the coated substrate in the presence of a free radical type catalyst.

17. The cured composition of claim 14.

* * * * *